US009349401B1

(12) United States Patent
Babinski et al.

(10) Patent No.: US 9,349,401 B1
(45) Date of Patent: May 24, 2016

(54) ELECTRONIC SYSTEM WITH MEDIA SCAN MECHANISM AND METHOD OF OPERATION THEREOF

(71) Applicant: Western Digital Technologies, Inc., Irvine, CA (US)

(72) Inventors: Alexander Babinski, Laguna Niguel, CA (US); Zhenyu Zhang, Irvine, CA (US); Eugene Chun-Tsing Wu, Irvine, CA (US); Alan M. Fossen, Silverado, CA (US); Chuanwen Ji, Irvine, CA (US); Duc T. Phan, Saratoga, CA (US); Donald Brunnett, Pleasanton, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/526,710

(22) Filed: Oct. 29, 2014

Related U.S. Application Data

(60) Provisional application No. 62/028,761, filed on Jul. 24, 2014.

(51) Int. Cl.
*G11B 5/60* (2006.01)
(52) U.S. Cl.
CPC ............ *G11B 5/6076* (2013.01); *G11B 5/6029* (2013.01)
(58) Field of Classification Search
None
See application file for complete search history.

(56) References Cited

U.S. PATENT DOCUMENTS

| 6,014,283 | A | 1/2000 | Codilian et al. |
|---|---|---|---|
| 6,052,076 | A | 4/2000 | Patton, III et al. |
| 6,052,250 | A | 4/2000 | Golowka et al. |
| 6,067,206 | A | 5/2000 | Hull et al. |
| 6,078,453 | A | 6/2000 | Dziallo et al. |
| 6,091,564 | A | 7/2000 | Codilian et al. |
| 6,094,020 | A | 7/2000 | Goretzki et al. |
| 6,097,559 | A * | 8/2000 | Ottesen .................. G11B 19/04 360/31 |
| 6,101,065 | A | 8/2000 | Alfred et al. |
| 6,104,153 | A | 8/2000 | Codilian et al. |
| 6,105,432 | A | 8/2000 | Taniguchi et al. |
| 6,122,133 | A | 9/2000 | Nazarian et al. |
| 6,122,135 | A | 9/2000 | Stich |
| 6,141,175 | A | 10/2000 | Nazarian et al. |
| 6,160,368 | A | 12/2000 | Plutowski |
| 6,181,502 | B1 | 1/2001 | Hussein et al. |
| 6,195,222 | B1 | 2/2001 | Heminger et al. |
| 6,196,062 | B1 | 3/2001 | Wright et al. |
| 6,198,584 | B1 | 3/2001 | Codilian et al. |
| 6,198,590 | B1 | 3/2001 | Codilian et al. |
| 6,204,988 | B1 | 3/2001 | Codilian et al. |
| 6,243,223 | B1 | 6/2001 | Elliott et al. |
| 6,281,652 | B1 | 8/2001 | Ryan et al. |
| 6,285,521 | B1 | 9/2001 | Hussein |
| 6,292,320 | B1 | 9/2001 | Mason et al. |
| 6,310,742 | B1 | 10/2001 | Nazarian et al. |
| 6,320,718 | B1 | 11/2001 | Bouwkamp et al. |
| 6,342,984 | B1 | 1/2002 | Hussein et al. |
| 6,347,018 | B1 | 2/2002 | Kadlec et al. |
| 6,369,972 | B1 | 4/2002 | Codilian et al. |
| 6,369,974 | B1 | 4/2002 | Asgari et al. |

(Continued)

*Primary Examiner* — Wayne Young
*Assistant Examiner* — James L Habermehl

(57) ABSTRACT

An apparatus includes: a media; a head over the media; a read channel, coupled to the head, configured to extract data from the media; control circuitry, coupled to the read channel, configured to execute a read command; and wherein the read channel is further configured to: generate, based on extracting the data from the media, a data condition indicator, and provide, for use by the control circuitry, the data and the data condition indicator.

24 Claims, 5 Drawing Sheets

(56) References Cited

U.S. PATENT DOCUMENTS

| | | |
|---|---|---|
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,567,229 B1 * | 5/2003 | Mallary ............... G11B 5/6005 360/75 |
| 6,568,268 B1 | 5/2003 | Bennett |
| 6,574,062 B1 | 6/2003 | Bennett et al. |
| 6,577,465 B1 | 6/2003 | Bennett et al. |
| 6,600,622 B1 * | 7/2003 | Smith ................. G11B 5/5552 360/75 |
| 6,614,615 B1 | 9/2003 | Ju et al. |
| 6,614,618 B1 | 9/2003 | Sheh et al. |
| 6,636,377 B1 | 10/2003 | Yu et al. |
| 6,683,737 B2 * | 1/2004 | Gong ................. G11B 5/59611 360/75 |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,927,929 B2 * | 8/2005 | Gong ................. G11B 5/59611 360/75 |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,463 B2 | 5/2006 | Gay Sam et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,578 B2 | 8/2006 | Ma |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,325 B1 | 1/2007 | Hu |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,206,159 B2 * | 4/2007 | White ...................... G11B 5/02 360/75 |
| 7,209,321 B1 | 4/2007 | Bennett |
| 7,212,364 B1 | 5/2007 | Lee |
| 7,212,374 B1 | 5/2007 | Wang et al. |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |

(56) References Cited

U.S. PATENT DOCUMENTS

| | | |
|---|---|---|
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 7,965,459 B2 * | 6/2011 | Narayanan ............ G11B 5/455 360/75 |
| 7,990,641 B2 * | 8/2011 | Tomita .................. G11B 5/40 360/75 |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |

(56) References Cited

U.S. PATENT DOCUMENTS

| | | |
|---|---|---|
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2003/0002183 A1 | 1/2003 | Fioravanti |
| 2003/0011915 A1* | 1/2003 | Riddering ............... G11B 5/58 360/75 |
| 2003/0193727 A1 | 10/2003 | Fioravanti et al. |
| 2005/0219725 A1* | 10/2005 | Ozanoglu ........ G11B 20/10009 360/25 |
| 2006/0193076 A1* | 8/2006 | Yori ...................... G11B 19/04 360/75 |
| 2008/0130159 A1* | 6/2008 | Dieron ................ G11B 5/6064 360/75 |
| 2008/0165446 A1* | 7/2008 | Partee ................. G11B 5/6005 360/75 |
| 2010/0035085 A1 | 2/2010 | Jung et al. |
| 2010/0134919 A1* | 6/2010 | Wilcox ............... G11B 5/5552 360/77.07 |
| 2010/0321812 A1* | 12/2010 | Tomita .................... G11B 5/40 360/31 |
| 2011/0157736 A1* | 6/2011 | Contreras ........... G11B 5/6011 360/31 |
| 2012/0284493 A1 | 11/2012 | Lou et al. |
| 2013/0120870 A1 | 5/2013 | Zhou et al. |
| 2013/0148240 A1 | 6/2013 | Ferris et al. |
| 2013/0170070 A1 | 7/2013 | Das et al. |

* cited by examiner

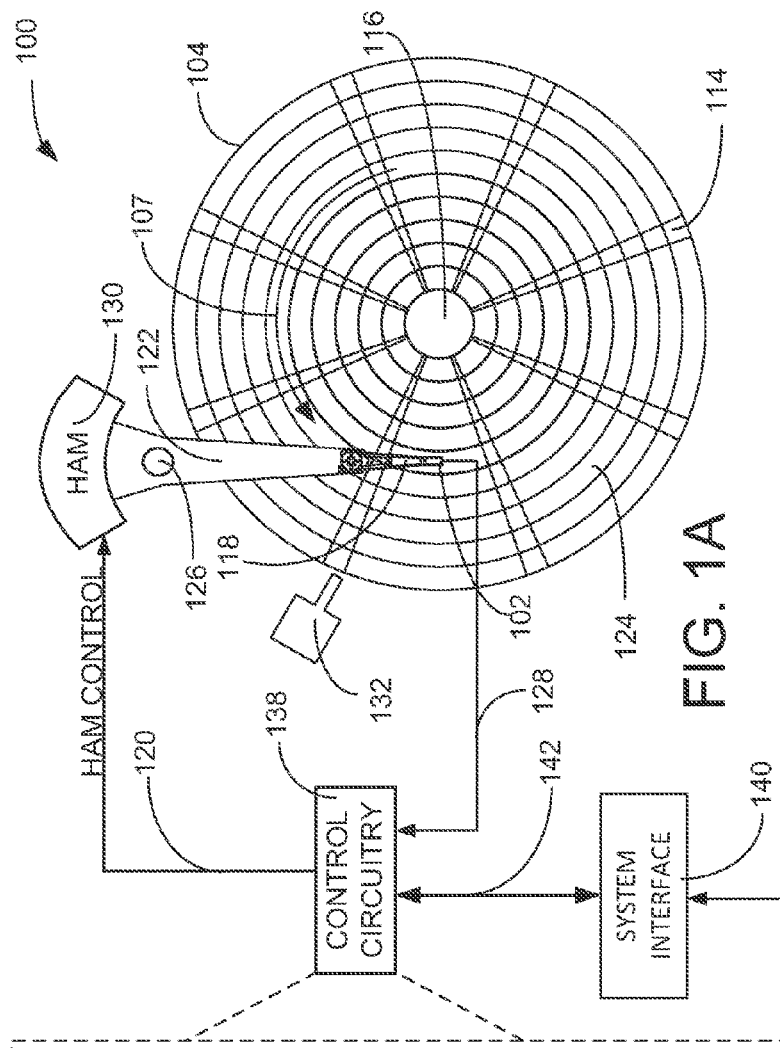
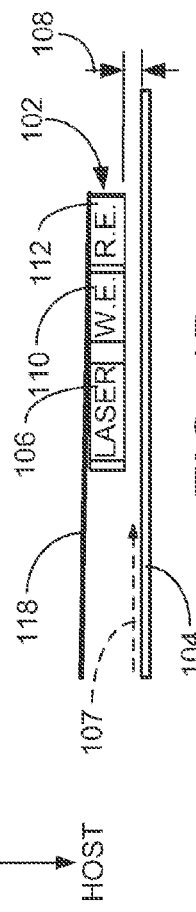
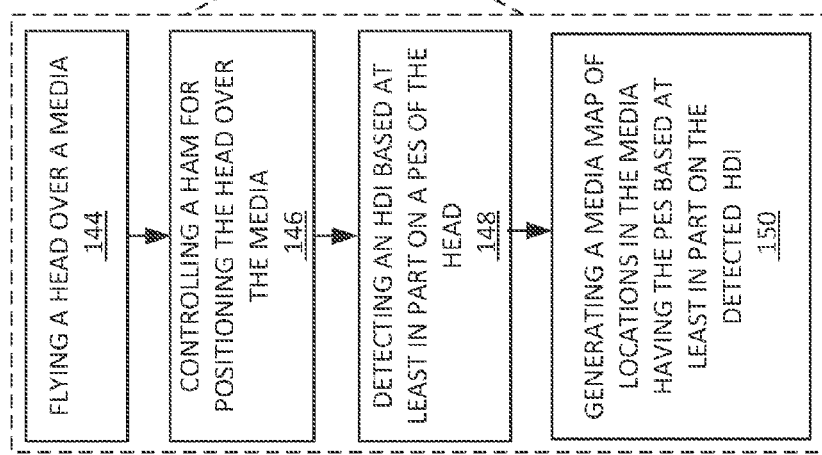

ELECTRONIC SYSTEM WITH MEDIA SCAN MECHANISM AND METHOD OF OPERATION THEREOF

CROSS-REFERENCE TO RELATED APPLICATION

This application claims the benefit of U.S. Provisional Patent Application Ser. No. 62/028,761 filed Jul. 24, 2014, and the subject matter thereof is incorporated herein by reference thereto.

TECHNICAL FIELD

An embodiment relates generally to an electronic system, and more particularly to a system for media scan.

BACKGROUND

Modern consumer and industrial electronic devices require storage of information, such as digital photographs, electronic mail, calendar, or contacts. These devices can be electronic systems, such as notebook computers, desktop computers, servers, televisions, and projectors, and are providing increasing levels of functionality to support modern life. Preserving the user data stored in the storage devices is of the utmost importance.

As recording technologies advance in hard disk drives, the Tracks-Per-Inch (TPI) has increased. This has become increasingly challenging to maintain the writer element over the center of the track as the tracks have become closer together. Manufacturing processes have recorded a per track position reference for the entire media. The per track position reference can be susceptible to transient media flaws caused by debris on the media surface. When the per track position reference is recorded in the presence of transient debris, the tracks can be susceptible to unreliable data read back due to mis-positioning of the per track position reference.

BRIEF DESCRIPTION OF THE DRAWINGS

FIGS. 1A, 1B, and 1C show an operational diagram of an electronic system with media scan according to one of the embodiments.

DETAILED DESCRIPTION

Figure 2:
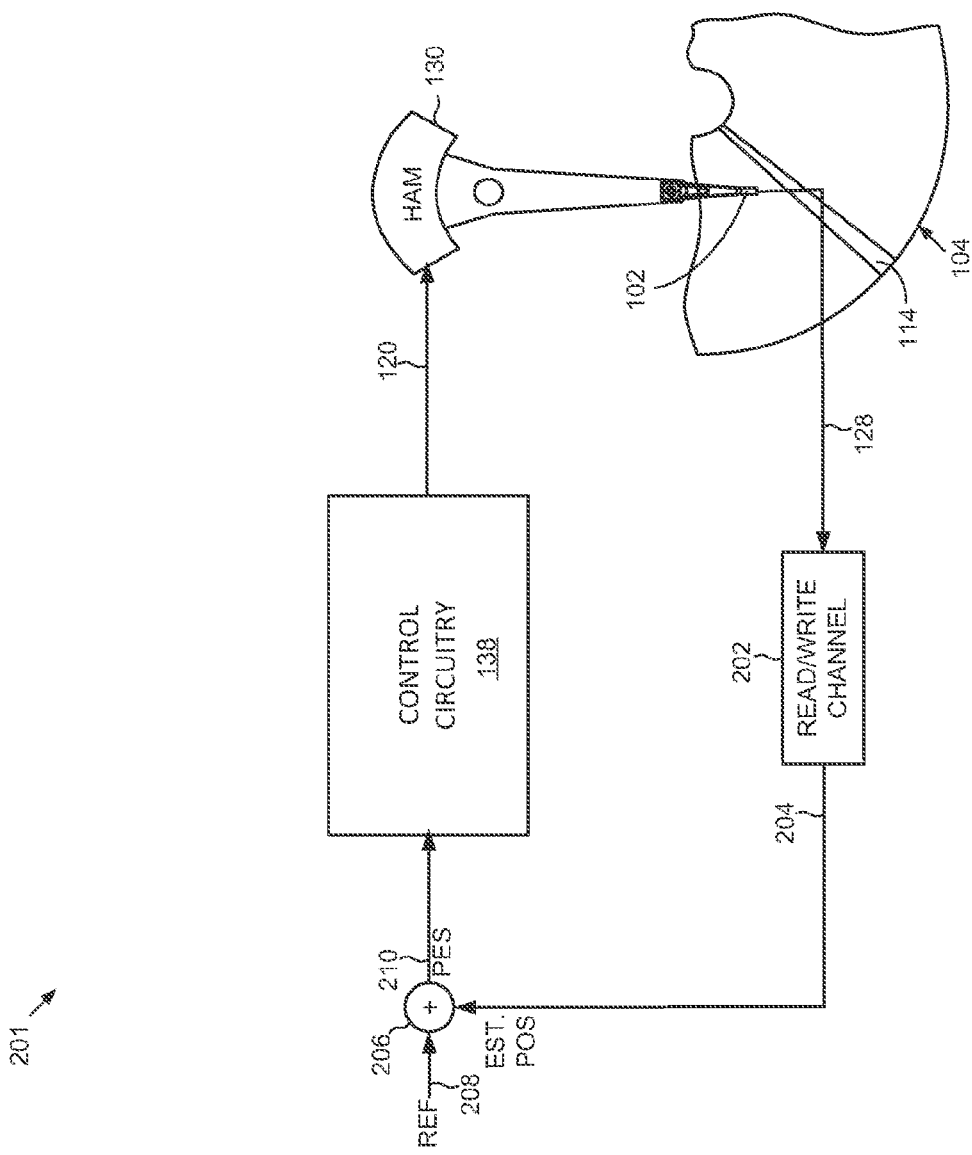
FIG. 2 shows a servo control system, of the electronic system 100, for generating a position error signal (PES), in accordance with an embodiment.

Storage systems can include storage devices, such as hard disk drives (HDD), solid state drives (SSD), hybrid drives, and optical storage devices. During the manufacturing processes, the foundation is laid for the performance and data reliability of the storage systems. The management of the media is a key piece the functional preparation of the end product. Debris or damage to the media should be detected and blocked from use in order to preserve data reliability and prevent subsequent damage to the head.

While the manufacturing scan activity has been extremely beneficial, it nevertheless has not yet been able to accommodate the transient nature of debris or media damage caused by head-disk interaction (HDI). HDDs have demonstrated that over 60% of failed drives are caused by head wear, as a result of excessive usage, damage from debris, and head-disk interaction caused by rapid changes in flying height due to damaged areas. As a result, the detection and avoidance of these areas of debris and media damage can extend the life and performance of the storage system.

A need still remains for an electronic system as various embodiments with media scan mechanism for providing reliable data while not prematurely wear-out the head or spreading debris across additional areas of the media. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Certain embodiments have other steps or elements in addition to or in place of those mentioned above. The steps or elements will become apparent to those skilled in the art from a reading of the following detailed description when taken with reference to the accompanying drawings.

The following embodiments are described in sufficient detail to enable those skilled in the art to make and use the various embodiments. It is to be understood that other embodiments would be evident based on the present disclosure, and that system, process, or mechanical changes can be made without departing from the scope of an embodiment.

In the following description, numerous specific details are given to provide a thorough understanding of the various embodiments. However, it will be apparent that the various embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the various embodiments can be operated in any orientation.

Referring now to FIGS. 1A, 1B, and 1C, therein are shown an operational diagram of an electronic system 100 according to an embodiment. The electronic system 100 can represent an apparatus for one of the various embodiments. Various embodiments can include the embodiment depicted in FIGS. 1A, 1B, and 1C which by way of an example is shown as a hard disk drive although it is understood that the electronic system 100 can be a tape drive, a solid-state hybrid disk drive, or other magnetic media-based storage device. Further for example, the electronic system 100 can represent a desktop computer, a notebook computer, a server, a tablet, a television, a household appliance, or other electronic systems utilizing magnetic media storage.

The electronic system 100 including a head 102 actuated over a media 104. The head 102 can be mounted to a flex arm 118 attached to an actuator arm 122. The head 102 (FIG. 1B) can optionally include a laser 106 for heating the media 104 during part of a write process (e.g., the head is part of an Energy-Assisted Magnetic Recording (EAMR) drive). A flying height 108 can be adjusted (e.g., by use of a heater element in the head not shown in FIG. 1B) while writing data to the media 104 or as an error recovery process during reading from the media 104. Also in an embodiment of FIG. 1B, the head 102 comprises a write element 110 (e.g., an inductive coil) and a read element 112 (e.g., a magnetoresistive read element).

The media 104 is a structure for storing information on data tracks 124. For example, the media 104 can be made of an aluminum alloy, ceramic/glass, or a similar non-magnetic material. The top and bottom surfaces of the media 104 can be covered with magnetic material deposited on one or both sides of the media 104 to form a coating layer capable of magnetization. As an example, the media 104 can be a disk platter for one embodiment of the electronic system 100 as a rotating storage system, such as a hard disk drive (HDD). As a further example, the media 104 can be a linear magnetic strip for one embodiment of the electronic system 100 as a linear storage system, such as a tape drive.

The laser 106, as an example, can be a laser diode or other solid-state based lasers. In addition, embodiments can employ any suitable techniques for focusing the laser 106 on the media 104, such as a suitable waveguide, magnifying lens, or other suitable optics. The laser 106 is increased to a write power in order to heat the disk, thereby decreasing the coercivity of the media 104 so that the data is written more reliably on the data tracks 124.

The spindle motor 116 can rotate the media 104, about a center of the media 104, at constant or varying speed 107. For illustrative purposes, the spindle motor 116 is described as a motor for a rotation, although it is understood that the spindle motor 116 can be other actuating motors for a tape drive, as an example.

As examples, a head actuation motor (HAM) 130 can be a voice coil motor assembly, a stepper motor assembly, or a combination thereof. The head actuation motor (HAM) 130 can generate a torque or force for positioning the head 102. The HAM 130 can operate in conjunction with a piezoelectric control on the head 102.

A tapered end of the flex arm 118 can support the head 102. The flex arm 118 can be mounted to the actuator arm 122, which is pivoted around a bearing assembly 126 by the torque generated by the head actuation motor 130. The head 102 can include a single instance of the write element 110 and a single instance of the read element 112 that is narrower than the write element 110. The head 102 can fly over the media 104 at a dynamically adjustable span of the flying height 108, which represents a vertical displacement between the head 102 and the media 104. The head 102 can be positioned by the flex arm 118 and the actuator arm 122 and can have the flying height 108 adjusted by control circuitry 138.

The head 102 can be positioned over the media 104 along an arc shaped path between an inner diameter of the media 104 and outer diameter of the media 104. For illustrative purposes, the actuator arm 122 and the head actuation motor 130 are configured for rotary movement of the head 102. The actuator arm 122 and the head actuation motor 130 can be configured to have a different movement. For example, the actuator arm 122 and the head actuation motor 130 could be configured to have a linear movement resulting in the head 102 traveling along a radius of the media 104.

The head 102 can be positioned over the media 104 to create magnetic transitions in the media 104 or detect magnetic transitions from the data tracks 124 recorded in the coating layer that can be used to represent written data or read data, respectively. The position of the head 102 and the speed 107 of the media 104 can be controlled by the control circuitry 138. Examples of the control circuitry 138 can include a processor, an application specific integrated circuit (ASIC) an embedded processor, a microprocessor, a hardware control logic, a hardware finite state machine (FSM), a digital signal processor (DSP), digital circuitry, analog circuitry, optical circuitry, or a combination thereof. The control circuitry 138 can also include memory devices, such as a volatile memory, a nonvolatile memory, or a combination thereof. For example, the nonvolatile storage can be non-volatile random access memory (NVRAM) or Flash memory and a volatile storage can be static random access memory (SRAM) or dynamic random access memory (DRAM).

A system interface 140 can couple the control circuitry 138 to a host electronics (not shown). The system interface 140 can transfer interface tasks 142 between the host electronics and the control circuitry 138. The interface tasks 142 can be encoded or decoded by the control circuitry 138 in preparation for transfer to or from the media 104.

The control circuitry 138 can be configured to control the spindle motor 116 for adjusting the speed 107 of the media 104. The control circuitry 138 can be configured to cause the head 102 to move relative to the media 104, or vice versa. The control circuitry 138 can be configured to control the speed 107 of the media 104 and the position of the head 102 by reading servo sectors 114 strategically placed on the media 104. The servo sectors 114 can be recorded on the media 104 during a manufacturing process. The control circuitry 138 can also be configured to scan the media 104 in order to detect the location of debris on the media 104 that can be caused by head-disk interaction.

In an embodiment, the electronic system 100 further comprises control circuitry 138 configured to execute the flow diagrams of FIG. 1C. As an example, actions 144 to 150 can represent the flow diagram where an embodiment is employing a data management mechanism for maintaining data integrity.

In an action 144, the head 102 is flown over the media 104 during execution by the electronic system 100, such as a manufacturing test fixture, a hard disk drive, a tape drive, or a hybrid drive.

In an action 146, the control circuitry can be configured to control a head actuation motor for positioning the head over the media. The control circuitry 138 can detect the actual position of the head relative to the intended position of the head by reading the servo sectors and monitoring a position error signal (PES).

In an action 148, the control circuitry can be configured to detect a head-disk interaction based at least in part on a position error signal (PES) of the head. It is understood that an instantaneous increase in the PES can indicate debris or media damage. The locations of the PES anomaly can be stored for further analysis.

In an action 150, the control circuitry can be configured to generate a media map of locations in the media having the PES based at least in part on the detected HDI. The media map can include the location and approximate size of the damaged area on the media. The media map can be used in the allocation of spare tracks and sectors and to establish keep-out areas reserved from use during normal user operations.

It has been discovered that an embodiment of the electronic system 100 can improve manufacturing yield. The electronic system 100 can provide a manufacturing mechanism that verifies the condition of the media 104 prior to recording the reference track location for user operation. Embodiments can allow the manufacturing process to identify and reserve damaged areas of the media 104 while generating the media map, which can be utilized in the normal operation of the electronic system 100 to avoid known media damage locations.

Referring now to FIG. 2, therein is shown a servo control system 201, of the electronic system 100, for generating a position error signal (PES) 210, in accordance with an embodiment. The servo control system 201 controls the head actuation motor 130 in order to position the head assembly 102 radially over the media 104. A read/write channel 202 demodulates the read signal 128 from the servo sectors 114 into an estimated position 204 for the head assembly 102 relative to the data track 124 of FIG. 1A on the media 104. The estimated position 204 is applied to a first adder 206 for subtracting a reference position 208 in order to generate the PES 210.

A magnitude of the PES 210 can be monitored by the control circuitry 138 for generating the HAM control signal 120 to prevent large tracking errors normally observed when debris is present on the media 104. The control circuitry 138 can also record the location of severe occurrences of the PES 210 based on thresholds established for the detection of the head-disk interaction.

It has been discovered that the debris caused by the head-disk interaction (HDI) can modify the reference position 208 during the manufacturing process. If the modification of the reference position 208 is not addressed during the manufacturing process, long term data reliability problems can occur. Embodiments of the electronic system 100 of FIG. 1A can allow detection of the debris caused by the head-disk interaction (HDI) in order to allow the manufacturing process the criteria to disqualify the damaged data tracks 124.

Figure 3:
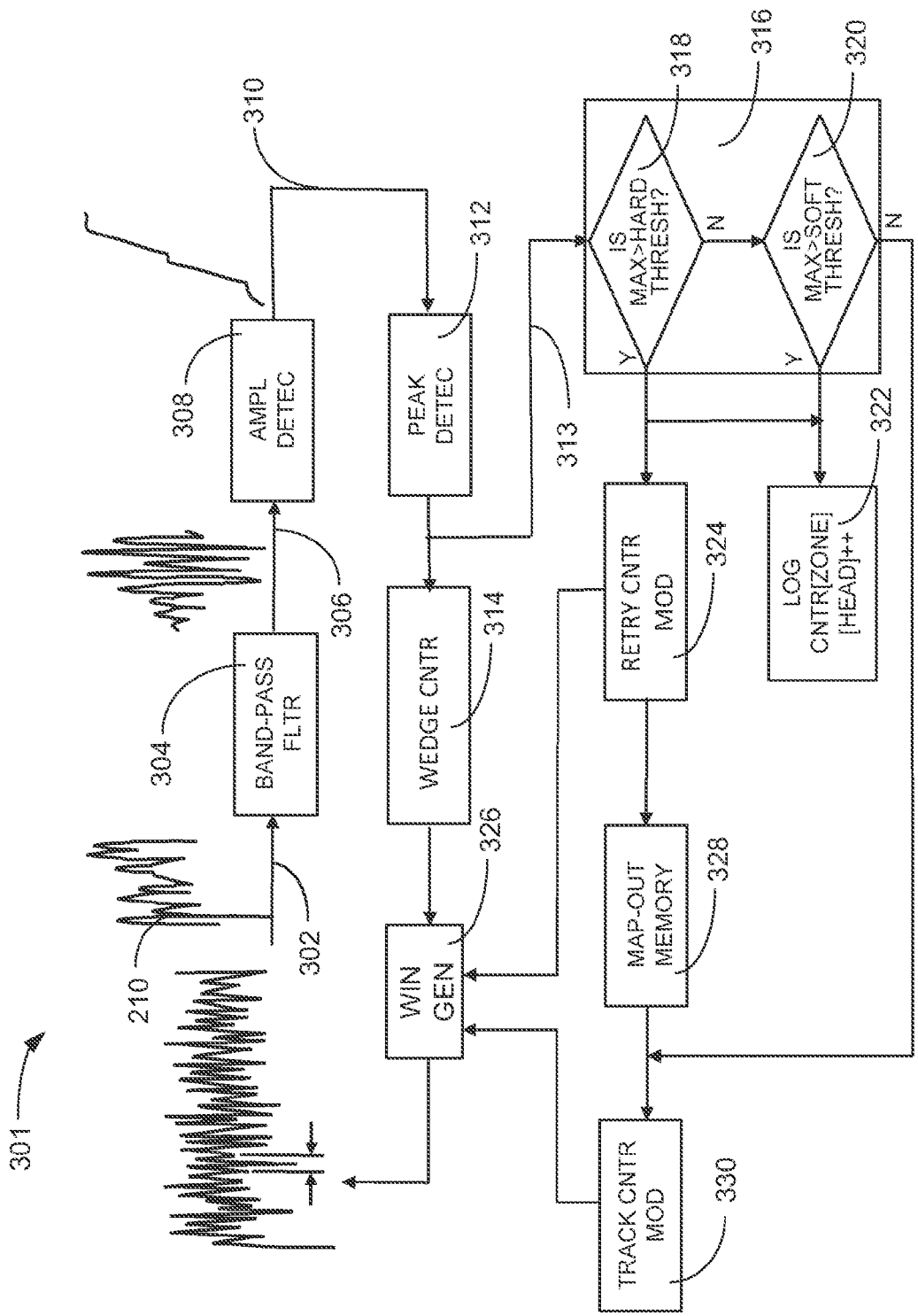
FIG. 3 is a functional block diagram of an HDI detection engine, for manufacturing media scan, in an embodiment.

Referring now to FIG. 3, therein is shown a functional block diagram of an HDI detection engine 301, for manufacturing media scan, in an embodiment. The functional block diagram of the HDI detection engine 301 may be implemented in the control circuitry 138. In an embodiment, the HDI detection engine 301 can include a number of components/modules as shown. Those skilled in the art will recognize that some components/modules may be combined into fewer components/modules or implemented as more components/modules while achieving the same results. As shown, the HDI detection engine 301 can include a PES input 302 to a band-pass filter 304, such as an $8^{th}$ order infinite impulse response (IIR) filter. The PES input 302 may be generated by controlling the head actuation motor for positioning the head over the media and processing read signals from the head as it flies over parts of the media. The band-pass filter 304 can receive the PES 210 in a raw state and pass only an HDI band 306, which can contains a particular frequency range which is determined by the HDI sensitive suspension mode of the flex arm 118 of FIG. 1A. By way of an example, the HDI band 306 can be in the range 17.5 to 21.5 kHz. It is understood that other frequency ranges are possible and that adjustments of the parameters of the band-pass filter 304 can change to a different frequency range.

The HDI band 306 can be an input to an amplitude detector 308, such as a first order low-pass filter, for performing a full-wave rectification of the HDI band 306. The amplitude detector 308 can produce the PES amplitude 310. A peak detector 312 can monitor the PES amplitude 310 for detecting a PES peak 313.

A wedge counter 314 can be coupled to the peak detector 312 for monitoring the wedge number of the servo sectors 114 of FIG. 1A. The peak detector 312 can also be coupled to an HDI threshold checker 316. The HDI threshold checker 316 can perform a hard threshold check 318 to determine if the PES peak 313 exceeds a hard HDI threshold 318, a soft HDI threshold 320, or a combination thereof.

The activation of the hard HDI threshold 318 or the soft HDI threshold 320 can cause the current sector number output of the wedge counter 314 to be written to a memory log 322 for further processing as a potential problem location or transient error. The hard HDI threshold 318 and the soft HDI threshold 320 can be adjusted by the control circuitry 138 of FIG. 1A. The hard HDI threshold 318 can be a level at which the detection of the PES peak 313 indicates that a solid repeatedly detectable error has been found that can be caused by an HDI media damage. The soft HDI threshold 320 can be a level at which the detection of the PES peak 313 indicates that a transient and possibly moveable error exists on the media 104 of FIG. 1A, which could be caused by debris in the data tracks 124. The presence of the debris in the data tracks 124 can indicate the presence of the HDI damage in a nearby one of the data tracks 124. The detection of the PES peak 313 over the soft HDI threshold 320 but not over the hard HDI threshold 318 can indicate a transient or temporary error in the data tracks 124. In some cases any debris that can cause the soft HDI threshold 320 to be activated might be swept from the media 104 in subsequent scan attempts. The memory log 322 can be stored in a volatile or non-volatile memory device, a communications port for manufacturing interface, a reserved area of the media 104, or a combination thereof.

The output of the hard HDI threshold 318 can activate a retry counter module 324. The retry counter module 324 can be coupled to a scan window generator 326. The scan window generator 326 can limit the samples of the PES 210 to a fixed number of the servo sectors 114. The effect of the HDI is localized to the area around the point of contact between the head 102 of FIG. 1B and the media 104 of FIG. 1B. By limiting the analysis to a given number of the servo sectors 114, a detailed location of the HDI can be identified.

The retry counter module 324 can hold the scan window generator 326 from altering the sampling window of the PES input 302. The retry counter module 324 can be configured to halt the progression of the scan window generator 326 until a terminal retry count is reached or the hard HDI threshold 318 is not detected on one of the retries. If the retry counter module 324 is initiated by the detection of the hard HDI threshold 318, but it is not asserted on a subsequent retry, the content of the wedge counter 314 remains in the memory log 322 as a transient error. If the hard HDI threshold 318 is asserted on each of the scans until the terminal count is detected, the wedge location output of the wedge counter 314 is written to a map-out memory 328. The map-out memory 328 can be a volatile or non-volatile memory device, a communications port for manufacturing interface, a reserved area of the media, or a combination thereof. The contents of the map-out memory 328 can be collected throughout the manufacturing process and the associated data tracks 124 of FIG. 1A are deallocated from the user capacity. The deallocation of the data tracks 124 can help prevent the spread of the debris and additional media damage caused by the head-disk interaction.

A track counter module 330 can keep a tally of the number of the data tracks 124 of FIG. 1A that have been scanned on the media 104. The track counter module 330 can be conditioned to halt the scan window generator 326 when a terminal track count is achieved. The track counter module 330 can also initialize the scan window generator 326 when a new track scan is initiated.

It has been discovered that the control circuitry 138 can configure the HDI detection engine 301 to adjust the levels of the hard HDI threshold 318, the soft HDI threshold 320, the retry counter module 324, and the parameters of the bandpass filter 304. The control circuitry 138 can also assign the location and attributes of the memory log 322 and the map-out memory 328. The adjustments allow the embodiments to be adapted for different mechanical structures of the head 102 and the flex arm 118. The control circuitry 138 can adjust the configuration in order to adapt to changes in the flying height 108 of FIG. 1B that might be required in different embodiments.

Figure 4:
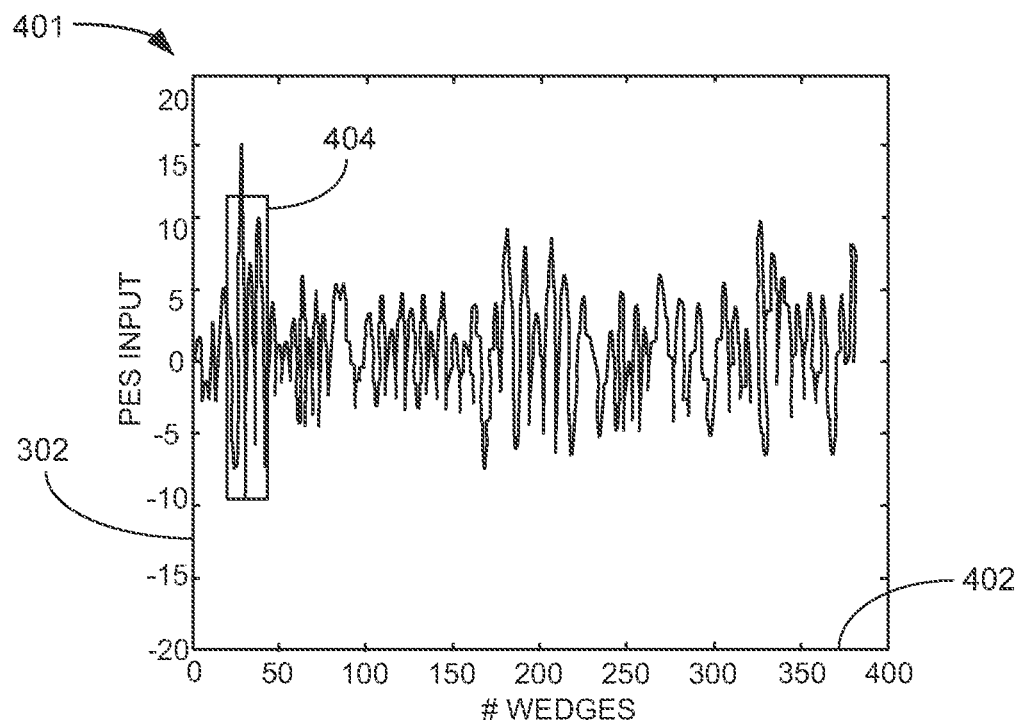
FIG. 4 provides an exemplary PES waveform of one of the embodiments of a HDI detection engine.

Referring now to FIG. 4, therein is shown an exemplary PES waveform 401 of one of the embodiments of a HDI detection engine in an embodiment. The exemplary PES waveform 401 depicts wedge numbers 402 along the horizontal axis and the PES input 302 along the vertical axis. An example of an HDI scan window 404 is shown sampling between wedge number 20 and wedge number 45 as an area of suspected HDI.

The PES input 302 can have a positive or negative sign indicating the direction of the position error relative to the center of the data track 124 of FIG. 1A. If the head 102 of FIG. 1A is positioned on a data track 124 with debris or damage to the media 104 of FIG. 1A, the magnitude of the PES input 302 can exceed the hard HDI threshold 318 of FIG. 3 or the soft HDI threshold 320 of FIG. 3.

The width of the HDI scan window 404 can be adjusted by the control circuitry 138 of FIG. 1A in order to verify the detection of the debris of media damage. As the scan window generator 326 increments across the wedge numbers 402, the width of the HDI scan window 404 can be adjusted in order to refine the identification of the location of the damage to the media 104. The HDI scan window 404 is shown between wedges 20 and 45 as an example only and the width of the HDI scan window 404 can differ. It is understood that the configuration of the HDI scan window 404 can be supported by an analysis algorithm that can dynamically adjust the width of the HDI scan window 404.

The HDI scan window 404 can incrementally move across the wedge numbers 402 of the data track 124 under analysis. If none of the PES input 302 exceeds the hard HDI threshold 318 or the soft HDI threshold 320, the HDI scan window 404 will reset to the beginning of the wedge numbers 402 as the track counter module 330 of FIG. 3 increments to the beginning of the next instance of the data track 124.

It has been discovered that the HDI scan window 404 can be adjusted dynamically to further identify the location of any debris or damage to the media 104. Each of the wedge numbers 402 that is identified as having exceeded the hard HDI threshold 318 or the soft HDI threshold 320 can be saved in the memory log 322 of FIG. 3 or the map-out memory 328 of FIG. 3 for later configuration of the available instances of the data tracks 124 on the media 104.

Figure 5:
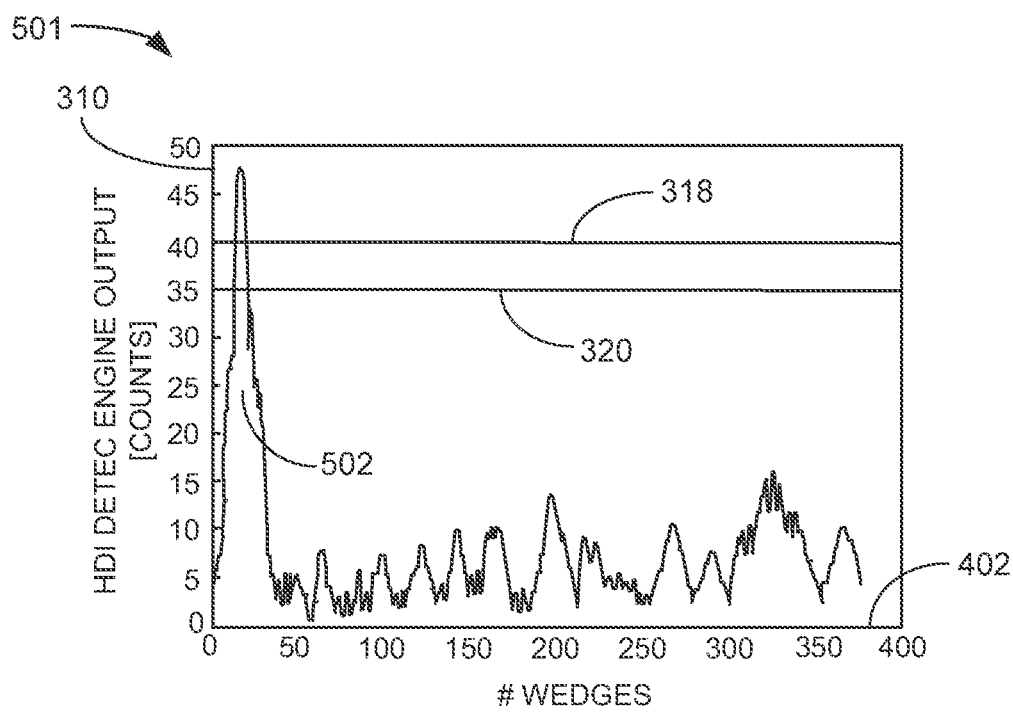
FIG. 5 provides an exemplary HDI scan waveform of one of the embodiments of the HDI detection engine.

Referring now to FIG. 5, therein is shown an exemplary HDI scan waveform 501 of one of the embodiments of the HDI detection engine 301 in an embodiment. The HDI scan waveform 501 depicts the wedge numbers 402 on the horizontal axis and the PES amplitude 310 on the vertical axis.

An HDI location 502 can be identified when the PES amplitude 310 exceeds the hard HDI threshold 318. The verification of the HDI location 502 can include multiple retries of the sampling of the HDI scan window 404 of FIG. 4. When all of the retries identify the wedge numbers 402 included in the HDI scan window 404 exceed the hard HDI threshold 318, the range of the wedge numbers included in the HDI scan window can be listed in the map-out memory 328 of FIG. 3. Any of the data tracks 124 of FIG. 1A having the HDI location 502 can be avoided in the final configuration of the user capacity in order to prevent the spread of the debris or creating additional damage to the media 104.

It is understood that the values indicated for the hard HDI threshold 318 or the soft HDI threshold 320 is an example only and other values can be used as appropriate to the electronic system 100 of FIG. 1A. Any instance of the PES amplitude 310 exceeding only the soft HDI threshold 320 can be listed to the memory log 322 of FIG. 3 as a suspected HDI location (not shown), which might not be included in the user capacity provided by the manufacturing process. In contrast any instance of the PES amplitude 310 exceeding only the hard HDI threshold 318 is detected as a permanent area of damage that can be removed from the user capacity provided by the manufacturing process.

Figure 6:
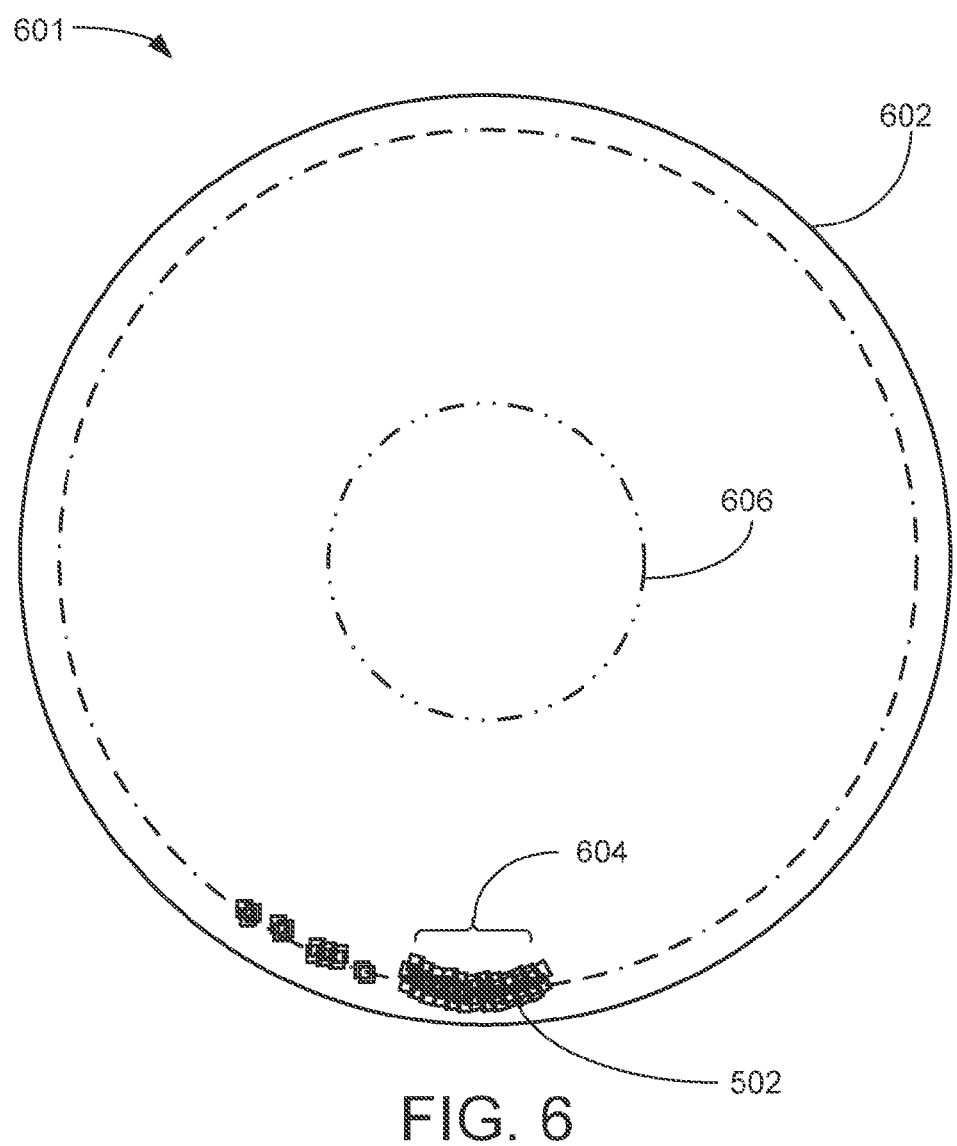
FIG. 6 shows a media map as recorded by the HDI detection engine in an embodiment.

Referring now to FIG. 6, therein is shown a media map 601 as recorded by the HDI detection engine 301 in an embodiment. The media map 601 depicts a media extent 602 indicating the outer range of the media 104 of FIG. 1A. The media extent 602 can represent the data track 124 of FIG. 1A that is closest to the outer diameter of the media 104.

The HDI location 502 can be a single occurrence of the debris or damage to one of the data tracks 124 on the media 104 or it can be an HDI cluster 604 of such occurrences that can span multiple of the data tracks 124. The occurrence of the HDI cluster 604 can present a risk to long term reliability if the damaged area of the data tracks 124, within the HDI cluster 604, are accessed. The debris that can be generated by the HDI cluster 604 can be spread by attempted use of the damaged area of the data tracks 124. An embodiment of the HDI detection engine 301 of FIG. 3 can provide the necessary information to avoid the HDI cluster 604 during user operations and thereby extend the usable life of the electronic system 100 of FIG. 1A.

A suspected HDI 606 can be identified when the PES amplitude 310 of FIG. 3 exceeds the soft HDI threshold 320 of FIG. 3 but does not exceed the hard HDI threshold 318 of FIG. 3. The identification of the soft HDI 606 can be useful in avoiding potentially damaged areas of the media 104 and preventing long term data reliability risk.

It is understood that the embodiment of the media map 601 can be different. It could be captured in an associated list, table, or other graphical form. The media map 601 can be maintained in the manufacturing process, stored in a reserved area of the media 104, or a combination thereof. The media map 601 can form the basis of a spare track and sector strategy operable by the user in the execution of normal field operation.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC. In addition, any of the above described modules and components may be implemented in firmware, software, hardware, or any combination thereof.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of various embodiments is that they valuably supports and services the historical trend of reducing costs, simplifying systems, and increasing performance.

These and other valuable aspects of the various embodiments consequently further the state of the technology to at least the next level.

While the various embodiments have been described in conjunction with a specific best mode, it is to be understood that many alternatives, modifications, and variations will be apparent to those skilled in the art in light of the aforegoing description. Accordingly, the embodiments are intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus comprising:
   a media;
   a head over the media;
   a head actuation motor coupled to the head;
   control circuitry, coupled to the head actuation motor, configured to position the head; and
   a read channel, coupled to the control circuitry, configured to generate a position error signal (PES) of the head;
   wherein the control circuitry is further configured to:
   detect a head disk interaction (HDI) based at least in part on the PES;
   monitor a retry count to deallocate a data track or log a transient error; and
   generate a media map of locations in the media based at least in part on the detected HDI.

2. The apparatus as claimed in claim 1 wherein the control circuitry is further configured to identify a sector location of the detected HDI.

3. The apparatus as claimed in claim 1 wherein the control circuitry is further configured to generate a filtered PES by applying a band pass filter to the PES.

4. The apparatus as claimed in claim 3 wherein the control circuitry is further configured to generate an off-track amplitude from the filtered PES and detect the HDI based on the filtered PES.

5. The apparatus as claimed in claim 1 wherein the control circuitry is further configured to detect the HDI based on a peak amplitude of the PES.

6. The apparatus as claimed in claim 1 wherein the control circuitry is further configured to analyze a data track by monitoring the PES between servo sectors.

7. The apparatus as claimed in claim 1 wherein the media map identifies a sector location, on the media, of the detected HDI when the PES exceeds a threshold.

8. The apparatus as claimed in claim 1 wherein the control circuitry is further configured to apply a threshold to determine a severity of the detected HDI.

9. The apparatus as claimed in claim 1 wherein the control circuitry is further configured to detect the HDI using a plurality of thresholds of different magnitudes of the PES.

10. The apparatus as claimed in claim 1 wherein the control circuitry is further configured to detect the HDI by applying a moving window to detect a localized signature of the PES indicative of the HDI.

11. A method of operating an apparatus, the method comprising:
    flying a head over a media;
    controlling a head actuation motor for positioning the head over the media;
    detecting a head disk interaction (HDI) based at least in part on a position error signal (PES) of the head;
    monitoring a retry count for deallocating a data track or logging a transient error; and
    generating a media map of locations in the media having the PES based at least in part on the detected HDI.

12. The method as claimed in claim 11 wherein identifying the location of the detected HDI includes identifying a sector location on a data track.

13. The method as claimed in claim 11 wherein analyzing the PES includes generating a filtered PES.

14. The method as claimed in claim 13 wherein analyzing the PES includes generating an off-track amplitude from the filtered PES and detecting the HDI based on the filtered PES.

15. The method as claimed in claim 11 wherein analyzing the PES includes detecting the HDI based on a peak amplitude of the PES.

16. The method as claimed in claim 11 wherein analyzing the PES includes analyzing a data track including monitoring the PES between servo sectors.

17. The method as claimed in claim 11 wherein identifying a location of the detected HDI includes generating a media map for identifying a sector location, on the media, when the PES exceeds a threshold.

18. The method as claimed in claim 11 further comprising applying a threshold to the PES for determining a severity of the detected HDI.

19. The method as claimed in claim 11 further comprising applying a plurality of threshold of different magnitudes to the PES for detecting the HDI.

20. The method as claimed in claim 11 wherein detecting the HDI includes applying a moving window for detecting a localized signature of the PES indicative of the HDI.

21. An apparatus comprising:
a media;
a head over the media;
a head actuation motor coupled to the head;
control circuitry, coupled to the head actuation motor, configured to position the head; and
read channel, coupled to the control circuitry, configured to generate a position error signal (PES) of the head;
wherein the control circuitry is further configured to:
analyze a data track by monitoring the PES between servo sectors;
detect a head disk interactions (HDI) based at least in part on the PES; and
generate a media map of locations in the media based at least in part on the detected HDI.

22. A method of operating an apparatus, the method comprising:
flying a head over a media;
controlling a head actuation motor for positioning the head over the media;
analyzing the PES includes analyzing a data track including monitoring a position error signal (PES) between servo sectors;
detecting a head disk interaction (HDI) base at least in part on the PES of the head; and
generating a media map of locations in the media having the PES based at least in part on the detected HDI.

23. An apparatus comprising:
a media;
a head over the media;
a head actuation motor coupled to the head;
control circuitry, coupled to the head actuation motor, configured to position the head; and
a read channel, coupled to the control circuitry, configured to generate a position error signal (PES) of the head;
wherein the control circuitry is further configured to:
detect a head disk interaction (HDI) based at least in part on the PES;
detect the HDI using a plurality of thresholds of different magnitudes of the PES; and
generate a media map of locations in the media based at least in part on the detected HDI.

24. An apparatus comprising:
a media;
a head over the media;
a head actuation motor coupled to the head;
control circuitry, coupled to the head actuation motor, configured to position the head; and
a read channel, coupled to the control circuitry, configured to generate a position error signal (PES) of the head;
wherein the control circuitry is further configured to:
detect a head disk interaction (HDI) based at least in part on the PES;
detect the HDI by applying a moving window to detect a localized signature of the PES indicative of the HDI; and
generate a media map of locations in the media based at least in part on the detected HDI.

* * * * *